US009426944B2

(12) United States Patent
Naeyaert et al.

(10) Patent No.: US 9,426,944 B2
(45) Date of Patent: Aug. 30, 2016

(54) AGRICULTURAL SQUARE BALER AND USE THEREOF

(71) Applicant: CNH INDUSTRIAL AMERICA LLC, New Holland, PA (US)

(72) Inventors: Karel Naeyaert, Oostkamp (BE); Robrecht M. K. Dumarey, Gistel (BE); Adrianus Naaktgeboren, Varsenare (BE); Johan A. E. Vande Ryse, Brugge (BE); Sandor Van Vooren, Sijsele-Damme (BE); Pieter Vandevelde, Sint Michiels Brugge (BE); Didier O. M. Verhaeghe, Ieper (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/772,886

(22) PCT Filed: Mar. 5, 2014

(86) PCT No.: PCT/EP2014/054216
§ 371 (c)(1),
(2) Date: Sep. 4, 2015

(87) PCT Pub. No.: WO2014/135564
PCT Pub. Date: Sep. 12, 2014

(65) Prior Publication Data
US 2016/0014965 A1    Jan. 21, 2016

(30) Foreign Application Priority Data

Mar. 7, 2013  (BE) .............................. BE2013/0148

(51) Int. Cl.
*A01F 15/04*     (2006.01)
*A01F 15/10*     (2006.01)

(52) U.S. Cl.
CPC ............. *A01F 15/042* (2013.01); *A01F 15/10* (2013.01); *A01F 15/101* (2013.01); *A01F 2015/102* (2013.01)

(58) Field of Classification Search
CPC ...... A01F 15/10; A01F 15/101; A01F 15/04; A01F 15/042; A01F 15/046; A01F 15/0825; A01F 2015/102; A01D 43/006; A01D 89/008
USPC ....... 100/4, 142, 179, 188 R, 189, 215, 240, 100/293, 291, 282; 56/341, 344, 438, 440, 56/443, 446, 432
See application file for complete search history.

(56) References Cited

U.S. PATENT DOCUMENTS

| | | | |
|---|---|---|---|
| 4,106,268 A * | 8/1978 | White | A01D 85/002 100/2 |
| 4,524,574 A * | 6/1985 | Ratzlaff | A01F 15/04 100/189 |
| 5,467,702 A | 11/1995 | Naaktgeboren et al. | |
| 6,298,646 B1 * | 10/2001 | Schrag | A01F 15/101 100/88 |
| 8,561,532 B2 | 10/2013 | Bergmann | |
| 8,813,642 B2 | 8/2014 | Arnould et al. | |
| 2012/0204740 A1 * | 8/2012 | Bergmann | A01F 15/101 100/99 |

FOREIGN PATENT DOCUMENTS

| | | |
|---|---|---|
| DE | 3437294 A1 | 4/1986 |
| EP | 1769674 A1 | 4/2007 |

* cited by examiner

*Primary Examiner* — Jimmy T Nguyen
(74) *Attorney, Agent, or Firm* — Patrick M. Sheldrake (57) ABSTRACT

Agricultural square baler wherein the pivotable member is mechanically linked to the drive shaft by a linkage of the baler provided for mechanically pivoting the pivotable member in relation to the rotation of the drive shaft.

14 Claims, 8 Drawing Sheets

AGRICULTURAL SQUARE BALER AND USE THEREOF

This application is the US National Stage filing of International Application Serial No. PCT/EP2014/054216 filed on Mar. 5, 2014 which claims priority to Belgian Application BE2013/0148 filed Mar. 7, 2013, each of which is incorporated herein by reference in its entirety.

FIELD OF THE INVENTION

The current invention relates to an agricultural square baler.

The present invention also relates to the use of the agricultural square baler according to the invention.

BACKGROUND OF THE INVENTION

Such agricultural square balers are already known to the person skilled in the art. WO 2011 053122 A1 for example describes an agricultural square baler with a parallelepipedal baling chamber. A plunger, driven by a main driving mechanism, is movably received along longitudinal axis of the baling chamber, with a feed inlet, through which crop material can be conveyed into the baling chamber to be compressed there by the plunger into bales. A duct is connected to the feed inlet for collecting crop material before it is batchwise stuffed into the baling chamber. A stuffer is provided for batchwise stuffing the collected crop material from the duct through the feed inlet into the baling chamber. The stuffer is operably associated with the duct and comprises a rotatable drive shaft, with at least one crank arm fixed to the drive shaft. Further the baler comprises a fork assembly comprising tines and at least one fork lever supporting the tines which is rotatably coupled to the at least one crank arm on the one hand and pivotably supported by at least one fulcrum of the stuffer on the other hand. Such a configuration of the fork assembly allows relative movement of the tines along at least a packer and a stuffer trajectory, as shown in the figures of WO 2011 053122 A1. The fulcrum is pivotably fixed to at least one pivotable member of the stuffer around a pivot for displacing the fulcrum along a predetermined fulcrum path to selectively move the tines along the respective trajectories. The pivoting of the pivotable member around the pivot to displace the fulcrum along the predetermined fulcrum path is driven by a fulcrum driving device which is mechanically independent of the main driving mechanism, i.e. not being linked to the main driving mechanism by mechanical links, such as bars, pistons, or gears to directly transfer any momentum of the main driving mechanism to the fulcrum driving device and/or the fulcrum.

However, in such a configuration the fulcrum driving device nevertheless needs to be synchronized with one or both of the main driving device and the drive shaft of the stuffer such that the desired trajectory is followed by the tines at the desired moment. Although a sensor is described for determining the position of the fulcrum along the fulcrum path and the state of the fulcrum driving means and a sensor is described for determining which type of trajectory is desired in function of the compression of the crop material received in the duct, WO 2011 053122 A1 remains silent on how the position of the fulcrum, determined by the fulcrum driving device, is coordinated with the rotation of the drive shaft in the baling chamber such as to obtain that the tines move along a predetermined desired trajectory, the desired trajectory being determined by the position of the fulcrum coordinated with the position of the plunger of the machine.

Therefore, it is an object of the current invention to provide means for coordinating the position of the fulcrum along the fulcrum path with respect to the rotary position of the drive shaft such as to obtain a predetermined trajectory for the tines to follow.

Thereto, the pivotable member is mechanically linked to the drive shaft by linking means of the baler provided for mechanically pivoting the pivotable member in relation to the rotation of the drive shaft.

Such a pivot member mechanically linked to the drive shaft by linking means of the baler has been found to allow an easy coordination of the position of the fulcrum along the fulcrum path with respect to the rotary position of the drive shaft such as to obtain a predetermined trajectory for the tines to follow.

Moreover, it has been found that such mechanical linkage is reliable, especially when compared to electronic systems.

Moreover, the linking means comprise at least a packer and a stuffer cam mounted to a cam shaft rotating together with the drive shaft, the cams comprising a predetermined respective circumferential surface surrounding the cam shaft, and a cam follower for following the circumferential surface of the cam for determining the distance of the circumferential surface of the respective cams with respect to the cam shaft and provided to mechanically transfer the determined distance of the circumferential surface of the cams with respect to the cam shaft in function of the rotation of the drive shaft to a position of the fulcrum along the fulcrum path such that the tines move along the packer and the stuffer trajectory respectively.

Such a configuration has been found to allow an easy and reliable coordination of the position of the fulcrum along the fulcrum path with respect to the rotary position of the drive shaft such as to obtain a predetermined trajectory for the tines to follow. Moreover, as the cam shaft and the drive shaft can be made to rotate together, preferably synchronously, for example using mechanical means, such as for example gears, etc. or for example when the drive shaft and the cam shaft are the same and the cam shaft thus is the drive shaft, a reliable mechanical coordination of the position of the fulcrum along the fulcrum path with respect to the rotary position of the drive shaft can be obtained.

The multiple cams have moreover been found to relatively easily allow different trajectories for the tines to follow. For example, it becomes possible to add and/or remove possible trajectories for the tines to follow by adapting, adding and/or removing cams to and/or from the cam shaft. Also, the change of trajectory for the tines to follow can be done easily by moving the cam follower across the surfaces of the different cams using an actuator allowing the cam follower and the cams to be moved with respect to each other. The actuator for example is part of the linking means.

DE 3437294 A1 describes a stuffer for a round baler, but also fails to disclose means for coordinating the position of the fulcrum along the fulcrum path, displaced by a pneumatic actuator, with respect to the rotary position of the drive shaft such as to obtain a predetermined trajectory for the tines to follow as it is not described.

EP 1 769 674 A1 describes a different way of creating different trajectories for the tines to follow. However, due to the lack of a movable fulcrum it has been found more difficult to provide the different trajectories for the tines to follow, for example due to the complex linkage linking the movement of the plunger to the movement of the stuffer although the drive shaft of the stuffer actually usually is relatively close to the drive of the plunger.

EP 0 636 308 A1 describes a stuffer for a square baler, and is related to allow the tines to follow a substantially identical trajectory with a different velocity of the tines along the trajectory. The pivotable member is mechanically linked to the drive shaft by linking means of the baler provided for mechanically pivoting the pivotable member in relation to the rotation of the drive shaft.

SUMMARY OF THE INVENTION

According to preferred embodiments of the current invention, the pivotable member comprises a first element comprising the fulcrum and a second element, the first element being mounted in the vicinity of the pivot to the second element and whereby the linkage means is connected to the second element to indirectly connect the cam follower to the fulcrum. Such a configuration has been found to provide a further reliable way of coordinating the position of the fulcrum along the fulcrum path with respect to the rotary position of the drive shaft such as to obtain a predetermined trajectory for the tines to follow.

According to more preferred embodiments of the current invention, the actuator is biased such that the cam follower is biased to following the surface of a preferential cam, preferably the stuffer cam. According to such embodiments, in case the actuator should for example fail, the cam follower is biased to following the surface of the preferential cam such that the tines follow a preferential trajectory, for example, providing basic functionality, preferably being the tines following the stuffing trajectory, to a square baler with a broken actuator, for example, in between two maintenances.

Preferably, the different trajectories comprise a packing trajectory to pack crop material in the duct. However, although such trajectory is desired for allowing increased control over the amount of material in the duct, for example when the material has a low density of its own when moved into the duct, it has been found that especially the stuffing trajectory is found important for the basis functioning of the square baler as it allows material to be moved from the duct into the baling chamber.

According to preferred embodiments of the current invention, the stuffer comprises at least two fork levers, at least two crank arms and at least two fulcrums, the fork levers being rotatably coupled to respective crank arms and pivotably supported by respective fulcrums. The fork levers, crank arms and fulcrums thus form assemblies of the respective fork levers rotatably coupled to the respective crank arms and pivotably supported by the respective fulcrums. Such a configuration allows to support and/or move the tines more reliably with respect to stuffers comprising, for example, a single crank arm and corresponding fulcrum.

According to preferred embodiments of the current invention, the respective assemblies of the respective fork levers rotatably coupled to the respective crank arms and pivotably supported by the respective fulcrums are positioned on opposing sides of the duct. Such configurations have been found to offer a stable pivotable support of the respective fulcrums.

To further increase reliability of the square baler, the stuffer preferably comprises at least two pivotable members, the respective fulcrums being fixed to respective pivotable members.

According to preferred embodiments of the current invention, the linking means mechanically link the cam follower to the at least two fulcrums.

According to preferred embodiments of the current invention, the cams are located near the center of the baler taken along cross direction of the baler. It has been found that in such configuration of the cams, the cam shaft can be connected more easily to, for example, the drive shaft, making it possible to, for example, avoid complicated linkage.

According to preferred embodiments of the current invention, at least one complementary cam is mounted to the cam shaft, the at least one complementary cam having a circumferential surface being complementary to the circumferential surface of the cams.

According to preferred embodiments of the current invention, a complementary cam follower is provided for following the circumferential surface of the at least one complementary cam.

According to preferred embodiments of the current invention, the cams, the cam follower, the at least one complementary cam and the complementary cam follower are kept in contact with their respective circumferential surface due to their mutual position with respect to each other vis-à-vis the cam shaft.

The invention also relates to the use of the agricultural square baler according to the invention.

BRIEF DESCRIPTION OF THE DRAWINGS

The invention will be further elucidated by means of the following description and the appended figures.

DETAILED DESCRIPTION OF EMBODIMENT(S)

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Figure 1:
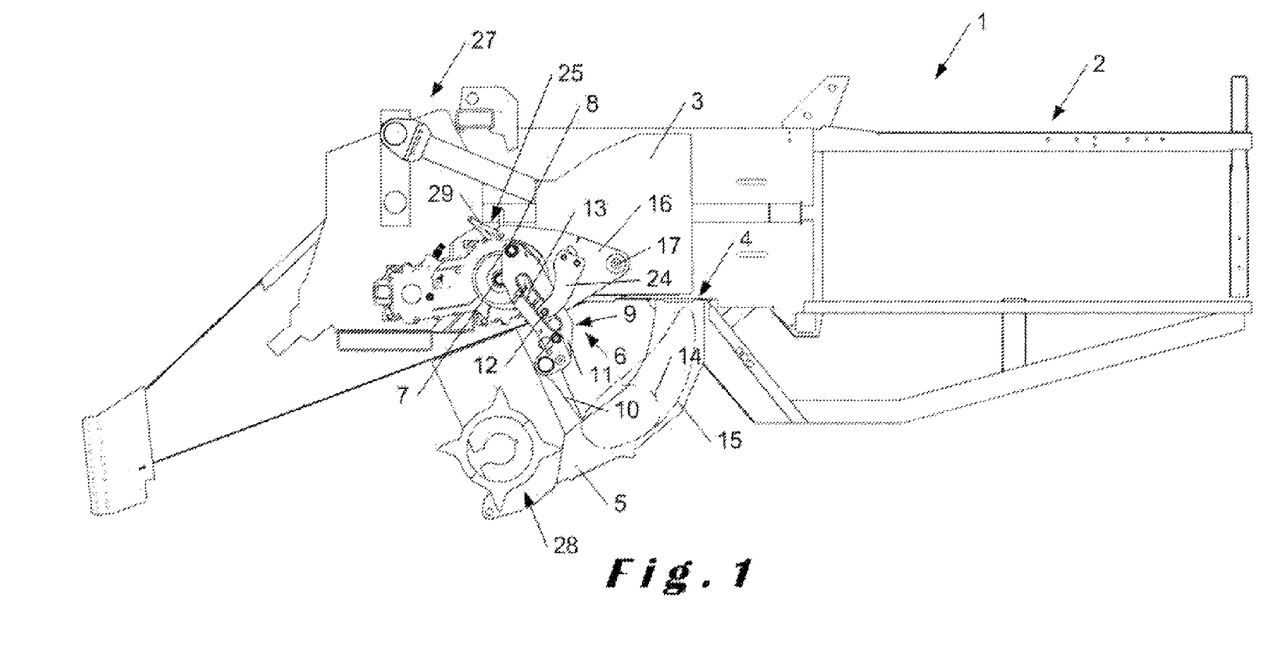
FIG. 1 shows a partial side view of a preferred embodiment of the agricultural square baler according to the invention.

FIG. 1 shows part of an agricultural square baler 1. The square baler 1 has a parallelepipedal baling chamber 2. In the baling chamber 2 a plunger 3 is movably received along longitudinal axis of the baling chamber 2. The plunger 3 and its drive 27 are for example shown in more detail in FIG. 2. Note that the plunger 3 is shown in a different view in FIG. 2. The baling chamber 2 has a feed inlet 4, through which crop material can be conveyed into the baling chamber 2 to be compressed there by the plunger 3 into bales.

FIG. 1 further shows that the baler 1 has a duct 5 which is connected to the feed inlet 4 for collecting crop material before it is batchwise stuffed into the baling chamber 2. The crop material is for example picked up from the field by pick-up means not shown in the figures and fed into the duct 5 by a rotor 28.

The baler 1 further comprises a stuffer 6 for batchwise stuffing the collected crop material from the duct 5 through the feed inlet 4 into the baling chamber 2. The stuffer 6 thereto is operably associated with the duct 5 and comprises a rotatable drive shaft 7, at least one crank arm 8 fixed to the drive shaft 7 and a fork assembly 9 comprising tines 10 and at least one fork lever 11 supporting the tines 10. The fork lever 11 is rotatably coupled to the at least one crank arm 8 on the one hand and pivotably supported by at least one fulcrum 12 of the stuffer 6 on the other hand. As is shown in FIG. 1 and in more detail in FIG. 3, the crank arm 8 has a longitudinal shape and is at one end connected to the drive shaft 7 and at the opposing end to the fork lever 11.

The connection of the fork lever 11 to the crank arm 8 and the fulcrum 12 along a fulcrum path 13 allow a relative movement of the tines 10 along at least a packer trajectory 14 and a stuffer trajectory 15. This is for example shown in FIGS. 5a-5d and 6a-6d.

FIGS. 5a-5d show the relative movement of the crank arm 8 driven by the drive shaft 7 and the fulcrum 12 with the tines 10 moving along the stuffer trajectory 15. The stuffer trajectory 15 batchwise stuffs the collected crop material from the duct 5 through the feed inlet 4 into the baling chamber 2. This is illustrated by the indicated movement of the tines 10 in the FIGS. 5a-5d as the indicated trajectory 15 covers a substantial part of the duct 5 and thus extends along a substantial part of the duct 5. Therefore, by moving the tines 10 along the duct 5, substantially all the crop material present in the duct 5 is pushed upwards in the duct 5 by the tines 10 such that the crop material is stuffed into the baling chamber 2 where it can be further formed into a bale by the plunger in its reciprocating motion inside the baling chamber 2.

FIGS. 6a-6d show the relative movement of the crank arm 8 driven by the drive shaft 7 and the fulcrum 12 with the tines 10 moving along the packer trajectory 14. The tines 10 in the packer trajectory 14 pack crop material in the duct 5, as can be for example deduced from the trajectory 14 shown in FIGS. 6a-6d which does not cover the entire duct 5 but merely extends along part of the duct 5, more in particular the lower part of the duct 5 such that by moving the tines 10 along the duct 5, the crop material present in the duct 5 is pushed upwards in the duct 5 by the tines 10 such that the crop material becomes more dense and effectively is packed together.

From FIGS. 5a-5d and FIGS. 6a-6d it can be deduced that the position of the fulcrum 12 along the fulcrum path 13 needs to be timed with the rotation of the drive shaft 7 in order to obtain the desired trajectory along which the tines 10 move.

To move the fulcrum 12, the fulcrum 12 is fixed to at least one pivotable member 16 of the stuffer 6 pivotable around a pivot 17 for displacing the fulcrum 12 along the predetermined fulcrum path 13 to selectively move the tines 10 along the respective trajectories 14, 15. This is for example shown in FIG. 1. The pivotable member 16 is shown in more detail in FIG. 3.

Figure 3:
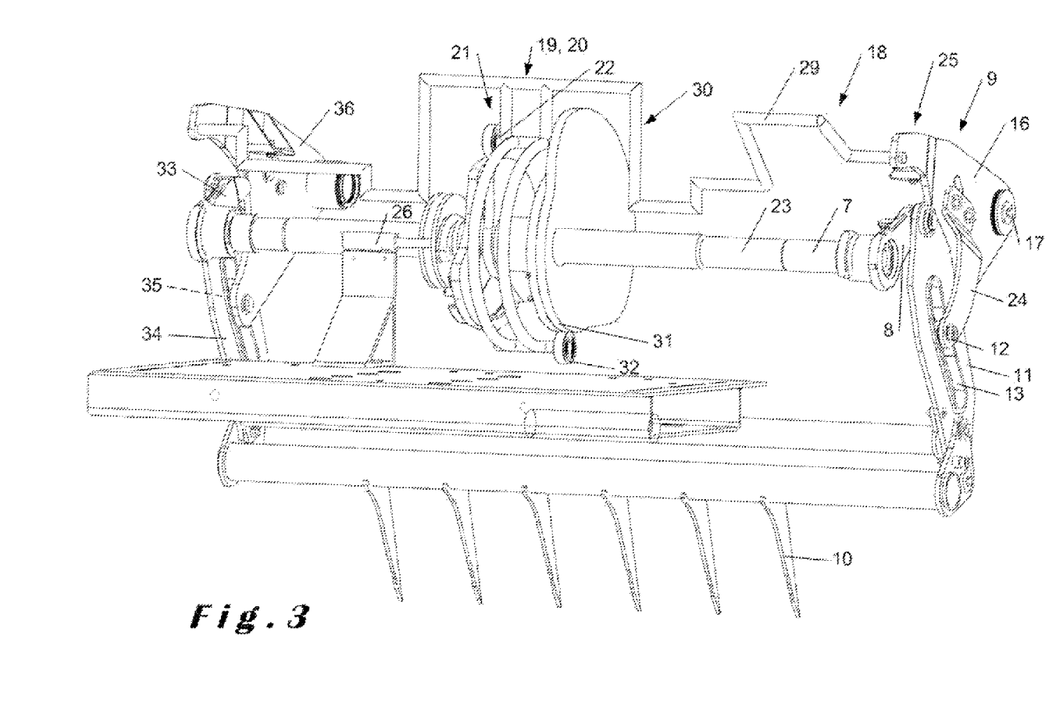
FIG. 3 shows a detail of the agricultural square baler shown according to FIG. 1.
Figure 4:
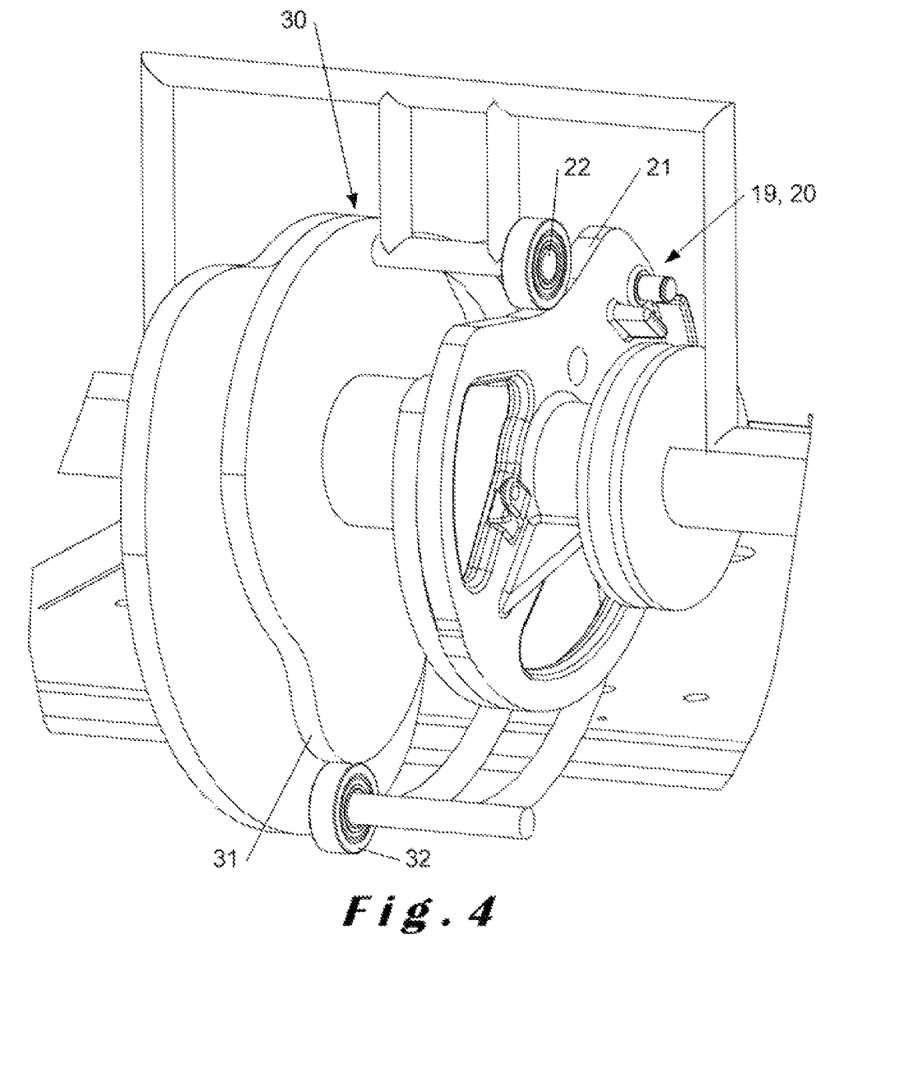
FIG. 4 shows a further detail of FIG. 3.
Figure 5A:
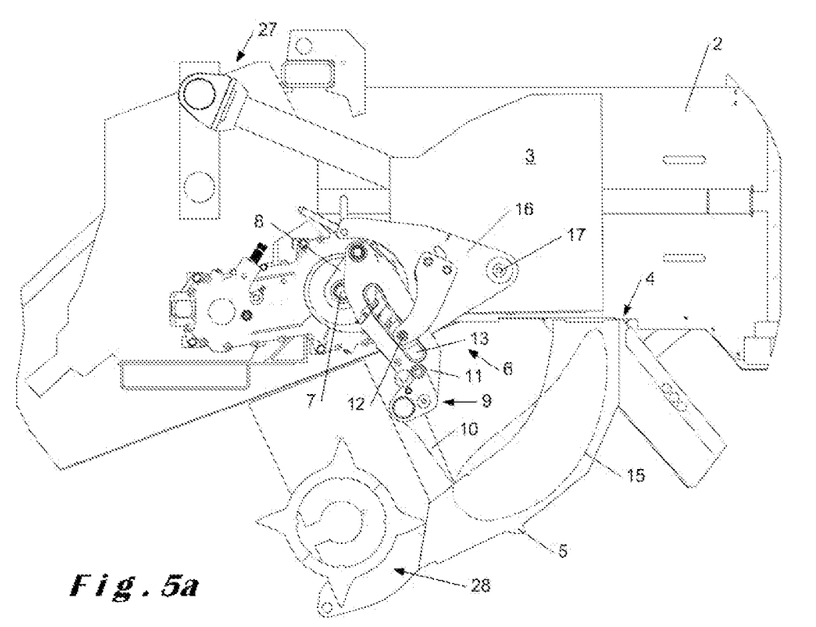
FIGS. 5*a*-5*d* show a preferred embodiment of a series of different steps of the movement of a part of the agricultural baler shown in FIG. 1.
Figure 5B:
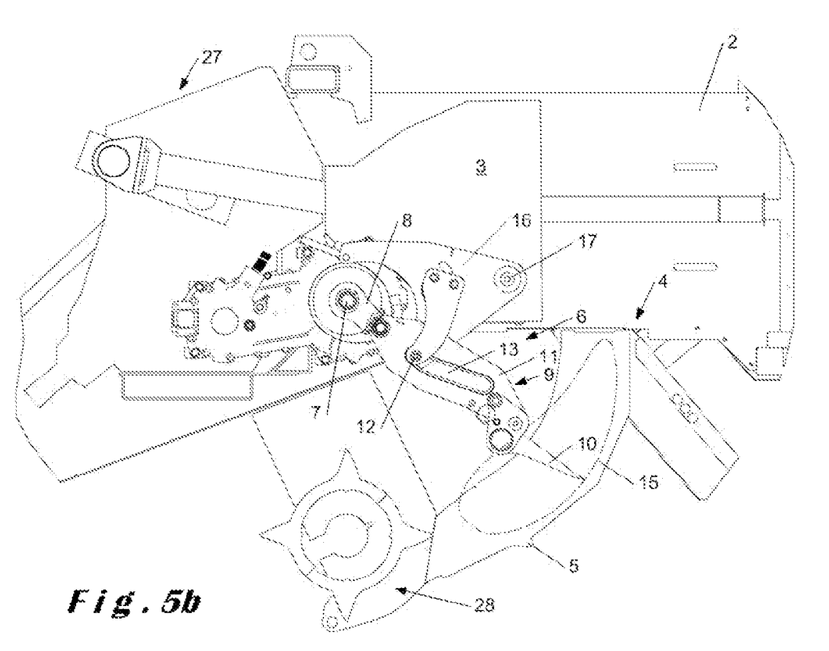
Figure 5C:
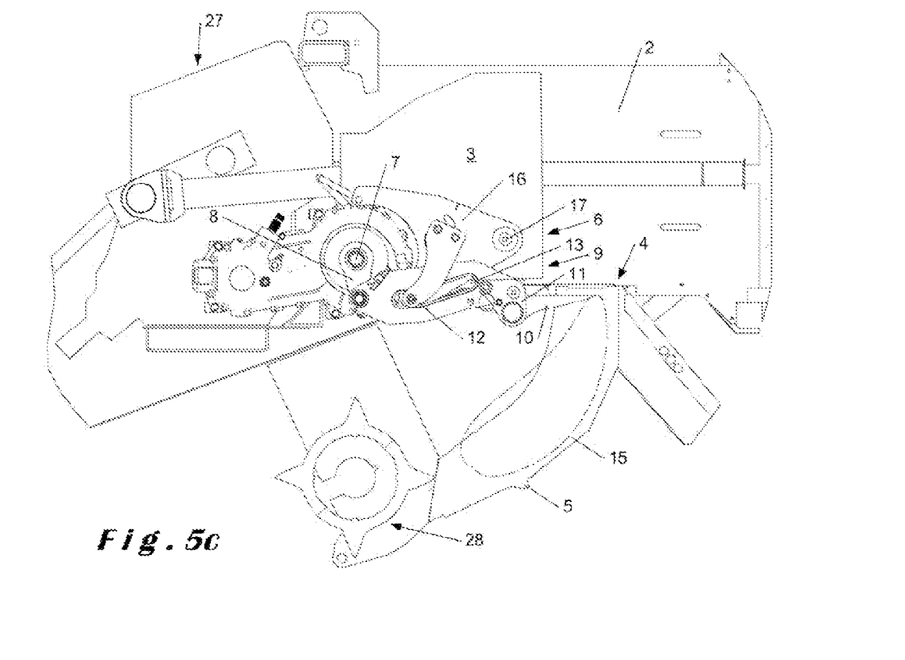
Figure 5D:
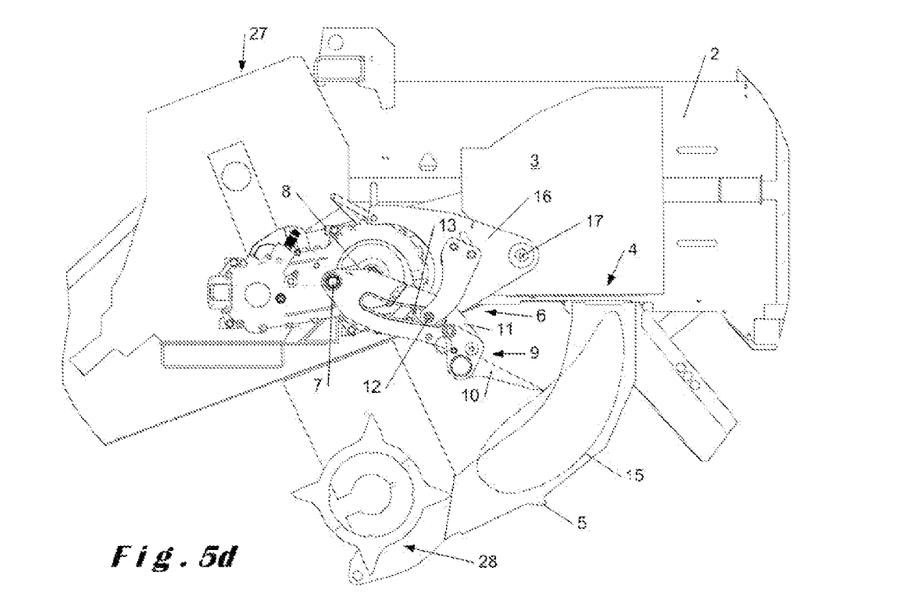
Figure 6A:
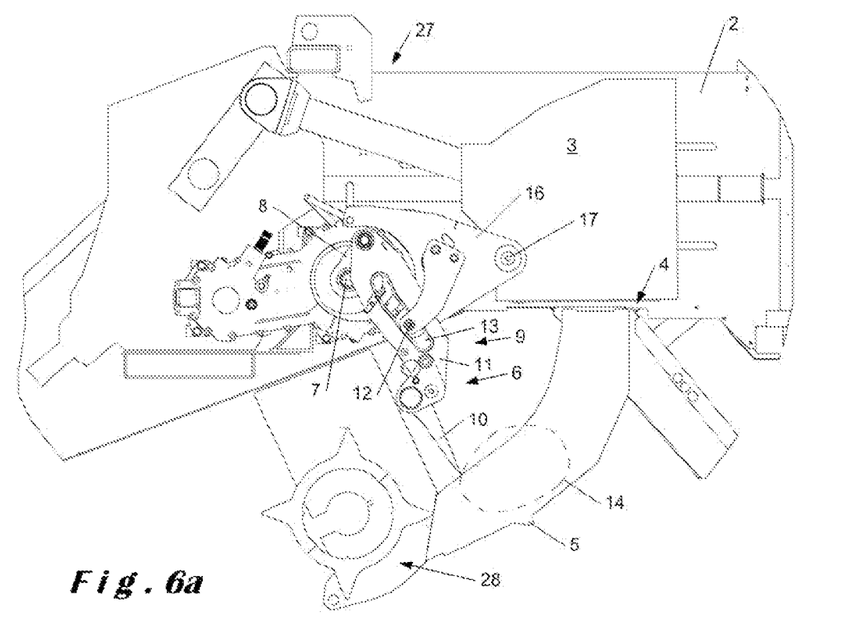
FIGS. 6*a*-6*d* show a preferred embodiment of a different series of different steps of the movement of a part of the agricultural baler shown in FIG. 1.
Figure 6B:
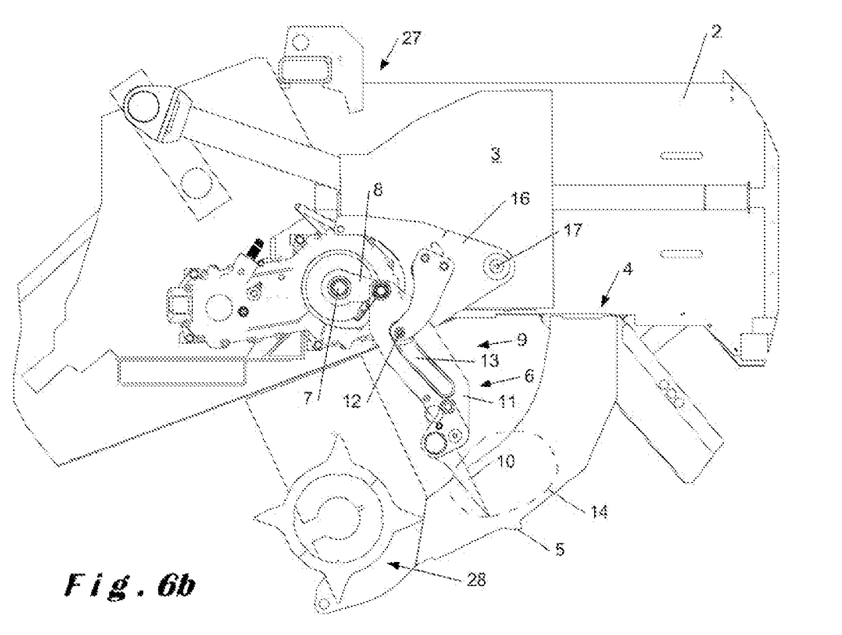
Figure 6C:
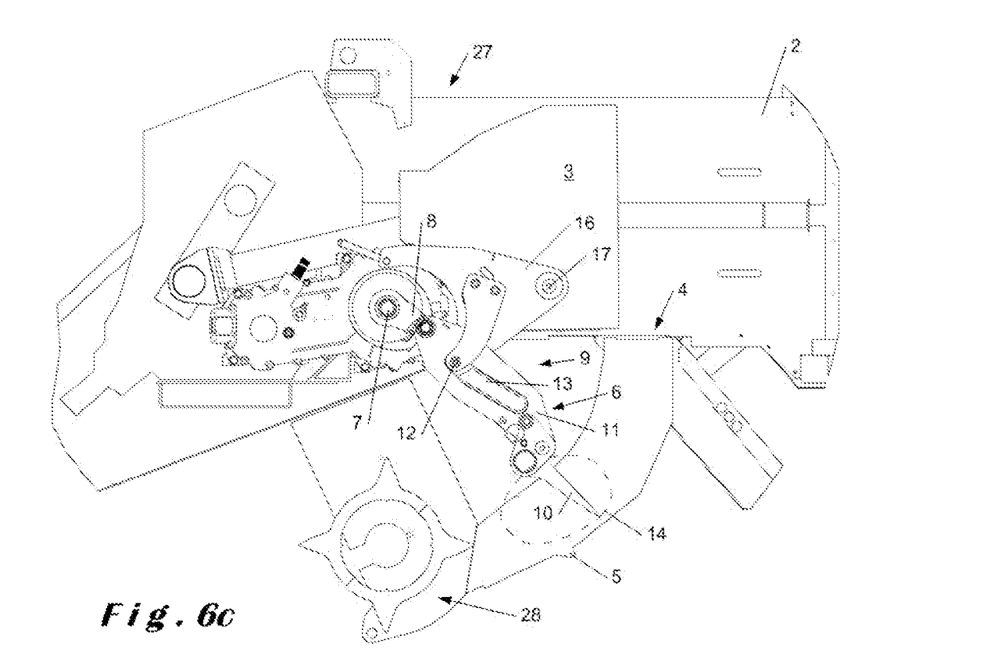
Figure 6D:
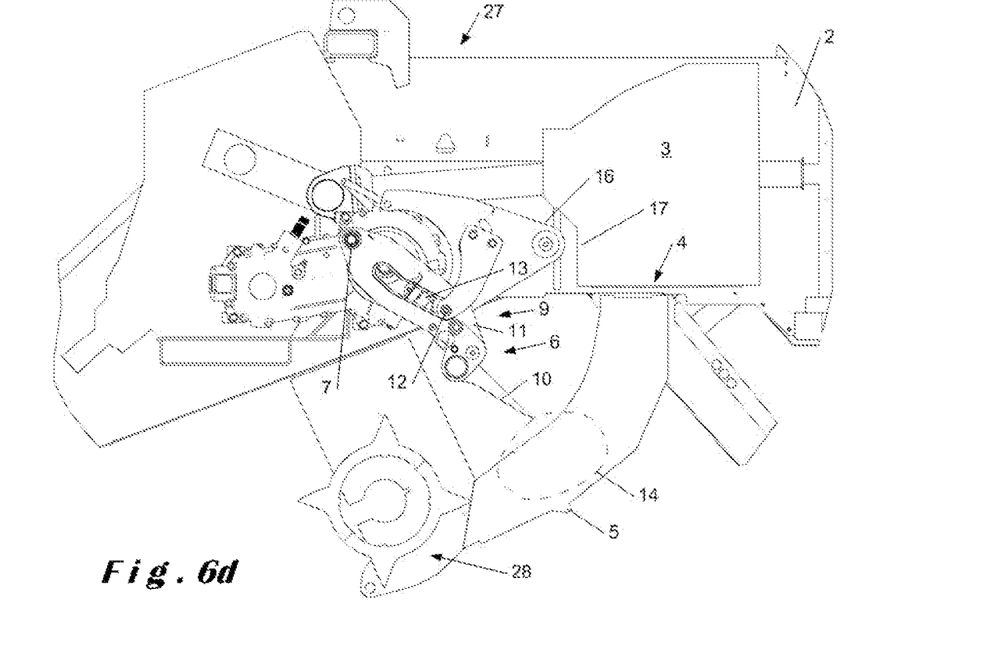

FIG. 3 further shows with more detail that the pivotable member 16 is mechanically linked to the drive shaft 7 by linking means 18 of the baler 1 provided for mechanically pivoting the pivotable member 16 in relation to the rotation of the drive shaft 7.

The linking means 18 comprise at least a packer and a stuffer cam 19, 20 mounted to a cam shaft 23 rotating together with the drive shaft 7. The cams 19, 20 comprise a predetermined respective circumferential surface 21 surrounding the cam shaft 23, and a cam follower 22 for following the circumferential surface 21 of the cams 19, 20 for determining the distance of the circumferential surface 21 of the respective cams 19, 20 with respect to the cam shaft 23. The cam follower 22 is provided to mechanically transfer the determined distance of the circumferential surface 21 of the cams 19, 20 with respect to the cam shaft 23 in function of the rotation of the drive shaft 7 to a position of the fulcrum 12 along the fulcrum path 13 such that the tines 10 move along the packer and the stuffer trajectory 14, 15 respectively. Thereto, as for example shown in FIG. 3, the cam follower 22 is connected to the pivotable member 16 such that the determined distance of the circumferential surface 21 of the cams 19, 20 with respect to the cam shaft 23 in function of the rotation of the drive shaft 7 is translated into an angular position of the pivotable member 16 around the pivot 17.

As shown in FIG. 3, the cam follower 22 thereto comprises linkage 29, translating the up and down movement of the cam follower 22 into a position of the fulcrum 12 along the fulcrum path 13 by changing the angular position around the pivot 17 of the pivotable member 16.

FIG. 3 further shows that the cam follower 22 and the cams 19, 20 are preferably provided to be moved with respect to each other by an actuator 26, not necessarily, of the linking means 18 such that the cam follower 22 can be moved across the surfaces 21 of the different cams 19, 20. The actuator 26 shown in FIG. 3 is a hydraulic actuator although this is not critical for the invention and any other actuator 26 can be used known to the person skilled in the art. FIG. 3 moreover shows that in order to reposition the cam follower 22 with respect to the surfaces 21 of the different cams 19, 20, the actuator 26 is provided to move the cams 19, 20 with respect to the remainder of the baler 1 along a cross direction of the baler 1. However, such configuration of the cams 19, 20 is not critical for the invention and the cam follower 22 can also be moved with respect to the remainder of the baler 1.

Although not shown in the figures, the actuator 26 is biased such that the cam follower 22 is biased to following the surface 21 of a preferential cam 19, 20. This can for example be done by a spring urging the cam follower 22 with respect to the surfaces 21 of the different cams 19, 20 such that the cam follower 22 preferably follows the surface 21 of the preferential cam 19, 20. In case the actuator 26 is provided to move the cams 19, 20 with respect to the remainder of the baler 1 along a cross direction of the baler 1, as shown in FIG. 3, for example a spring is provided pushing onto the cams such that, for example, upon malfunctioning of the actuator 26, for example due to a hydraulic effect in case the actuator 26 is a hydraulic actuator, the cams 19, 20 are moved with respect to the cam follower 22 such that the cam follower 22 follows the preferential cam 19, 20, which preferably is the stuffer cam 20 such that crop material keeps being batchwise stuffed into the baling chamber 2 in spite of the malfunctioning.

FIG. 3 shows that the drive shaft 7 and the cam shaft 23 are the same. Although such configuration allows an easy and almost failsafe coordination of the rotation of the drive shaft 7 and the cam shaft 23, this is not critical for the invention and the shafts 7, 23 can also be coordinated by for example linking the two separate shafts 7, 23 to each other and thus coordinating their movement. For example, the drive shaft 7 and the cam shaft 23 can be different shafts rotating synchronously using, for example, any one or more of gears, belts, pulleys, clutches, etc.

FIG. 3 shows that the cams 19, 20 are in the form of discs extending around the cam shaft 23 and having an outer circumferential surface 21 provided to be followed by the cam follower 22. The cam follower 22 is in the form of a wheel provided to roll over the circumferential surface 21.

Although FIG. 3 shows that the circumferential surface 21 of the cams 19, 20 is an outer delimiting circumferential surface of the cams 19, 20, in the form of discs surrounding the cam shaft 23, such a configuration is not critical for the invention and the circumferential surface of the cam followed by the cam follower 22 can also be, for example, in the form of a groove extending along the surface of the discs.

The cam follower 22 and/or the cams 19, 20 are provided with means for keeping the cam follower 22 in contact with the circumferential surface 21.

FIG. 3 for example shows that the cam follower 22 is kept in contact with the circumferential surface 21 using a pair of complementary cams 30, for example similar to the cams 19, 20. The complementary cams 30 are provided to the cam shaft 23 and have a circumferential surface 31 which is complementary to the circumferential surface 21 of the cams 19, 20. A complementary cam follower 32 is provided for following the circumferential surface 31 of the complementary cams 30. The cams 19, 20, the cam follower 22, the complementary cams 30 and the complementary cam follower 32 are arranged such that the cam follower 22 and the complementary cam follower 32 are kept in contact with their respective circumferential surface 21, 31 due to their mutual position with respect to each other vis-à-vis the cam shaft 23. Together they mechanically transfer the determined distance of the circumferential surfaces 21, 31 of the cams 19, 20, 30 with respect to the cam shaft 23 in function of the rotation of the drive shaft 7 to a position of the fulcrum 12 along the fulcrum path 13 such that the tines 10 move along the packer and the stuffer trajectory 14, 15 respectively. To that end, the cam follower 22 and the complementary cam follower 32 are for example positioned with respect to each other around the cam shaft 23 at different angular positions and are attached to each other. For example, as shown in FIG. 3, the cam follower 22 and the complementary cam follower 32 are positioned at substantially 180° with respect to each other around the cam shaft 23. In such a position, movement of the cam follower 22 will be translated to a complementary movement of the complementary cam follower 32 whereas, due to the positioning of the cam followers 22, 32 with respect to the cam shaft 23 and the complementarity of the cams 19, 20, 30, the cam followers 22, 32 will be kept in contact with their respective cams 19, 20, 30.

Such a configuration is however not critical for the invention and the cam follower 22 can be kept in contact with the cams 19, 20 more in particular their circumferential surface 21 using, for example a spring urging the cam follower 22 towards the circumferential surface 21.

FIG. 3 also shows the preferred pivotable member 16 into more detail. The preferred pivotable member 16 shown comprises a first element 24 comprising the fulcrum 12 and a second element 25, the first element 24 being mounted in the vicinity of the pivot 17 to the second element 25 by means of bolts. The linkage means 18 is attached to the second element 25, thus indirectly connecting the cam follower 22 to the fulcrum 12, 35.

As can be seen in FIG. 3, the stuffer 6 preferably comprises at least two fork levers 11, 34, at least two crank arms 8, 33 and at least two fulcrums 12, 35. The fork levers 11, 34 are rotatably coupled to respective crank arms 8, 33 and pivotably supported by respective fulcrums 12, 35. Although the tines 10 could be supported by a single fork lever, an additional fork lever 34 allows a more stable and reliable attachment of the tines 10. The fork lever 11, the crank arm 8 and the fulcrum 12 form an assembly and the fork lever 34, the crank arm 33 and the fulcrum 35 form another assembly which are preferably, as shown in FIGS. 1, 2 and 3, positioned on opposing sides of the duct 5 to further increase stability and reliability of the attachment of the tines 10.

Likewise, the stuffer 6 comprises at least two pivotable members 16, 36, the respective fulcrums 12, 35 being fixed to respective pivotable members 16, 36. Although this is not critical for the invention, the presence of additional pivotable members 36 allow to further increase stability and reliability of the attachment of the tines 10 and moreover the movement of the tines 10 along the different trajectories.

Preferably, as shown in FIG. 3 the linking means 18 mechanically link the cam follower 22 to the at least two fulcrums 12 to further increase stability and reliability of the attachment of the tines 10 and moreover the movement of the tines 10 along the different trajectories.

Figure 2:
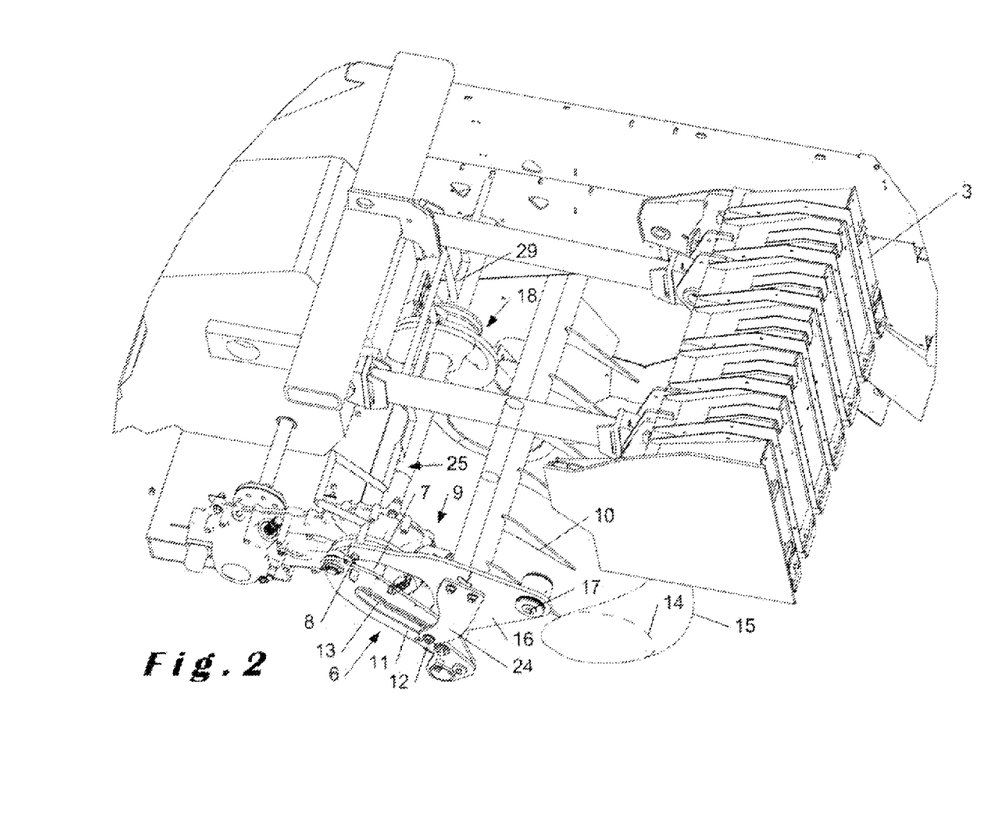
FIG. 2 shows a partial view in perspective of the agricultural square baler according to FIG. 1.

As shown in FIGS. 2 and 3, the cams 19, 20 and if present 30 are located near the center of the baler 1 taken along cross direction of the baler 1.

The invention claimed is:

1. An agricultural square baler, comprising:
a baling chamber, in which a plunger is movably received along longitudinal axis of the baling chamber;
a feed inlet, through which crop material can be conveyed into the baling chamber to be compressed there by the plunger into bales,
a duct connected to the feed inlet for collecting crop material before it is stuffed into the baling chamber; and
a stuffer for stuffing the collected crop material from the duct through the feed inlet into the baling chamber, the stuffer, operably associated with the duct, comprising a rotatable drive shaft, at least one crank arm fixed to the drive shaft and a fork assembly comprising tines and at least one fork lever supporting the tines and being rotatably coupled to the at least one crank arm on the one hand and pivotably supported by at least one fulcrum of the stuffer on the other hand, allowing relative movement of the tines along at least a packer trajectory and a stuffer trajectory, the tines in the packer trajectory packing crop material in the duct and in the stuffer trajectory stuffing the collected crop material from the duct through the feed inlet into the baling chamber, the fulcrum fixed to at least one pivotable member of the stuffer pivotable around a pivot for displacing the fulcrum along a predetermined fulcrum path to selectively move the tines along the respective trajectories,
wherein the at least one pivotable member is mechanically linked to the drive shaft by a linkage of the baler provided for mechanically pivoting the at least one pivotable member in relation to the rotation of the drive shaft and in that the linkage comprises at least a packer cam and a stuffer cam mounted to a cam shaft rotating together with the drive shaft, the cams comprising a predetermined respective circumferential surface surrounding the cam shaft, and a cam follower for following the circumferential surface of the cams for determining the distance of the circumferential surface of the respective cams with respect to the cam shaft and provided to mechanically transfer the determined distance of the circumferential surface of the cams with respect to the cam shaft based on the rotation of the drive shaft to a position of the fulcrum along the fulcrum path such that the tines move along the packer and the stuffer trajectory respectively.

2. The agricultural baler according to claim 1, wherein the cam follower and the cams are provided to be moved with respect to each other by an actuator such that the cam follower is moved across the surfaces of the different cams.

3. The agricultural square baler according to claim 1, wherein an actuator is biased such that the cam follower is biased to following the surface of a preferential cam.

4. The agricultural square baler according to claim 1, wherein the pivotable member comprises a first element comprising the fulcrum and a second element, the first element being mounted in the vicinity of the pivot to the second element to indirectly connect the cam follower to the fulcrum.

5. The agricultural square baler according to claim 1, wherein the cam shaft and the drive shaft rotate synchronously.

6. The agricultural square baler according to claim 5, wherein the cam shaft is the drive shaft.

7. The agricultural square baler according to claim 1 wherein the stuffer comprises at least two fork levers, at least two crank arms and at least two fulcrums, the fork levers rotatably coupled to respective crank arms and pivotably supported by respective fulcrums.

8. The agricultural square baler according to claim 7, wherein the respective assemblies of the respective fork levers rotatably coupled to the respective crank arms and pivotably supported by the respective fulcrums are positioned on opposing sides of the duct.

9. The agricultural square baler according to claim 7, wherein the stuffer comprises at least two pivotable members, the respective fulcrums being fixed to respective pivotable members.

10. The agricultural square baler according to claim 7, wherein the linkage mechanically links the cam follower to the at least two fulcrums.

11. The agricultural square baler according to claim 1, wherein the cams are located near the center of the baler taken along cross direction of the baler.

12. The agricultural square baler according to claim 1, wherein at least one complementary cam is mounted to the cam shaft, the at least one complementary cam having a circumferential surface being complementary to the circumferential surface of the cams.

13. The agricultural square baler according to claim 12, wherein a complementary cam follower is provided for following the circumferential surface of the at least one complementary cam.

14. The agricultural square baler according to claim 13, wherein the cams, the cam follower, the at least one complementary cam and the complementary cam follower are kept in contact with their respective circumferential surface due to their mutual position with respect to each other in relation to the cam shaft.

* * * * *